US008740228B2

(12) United States Patent
Patterson et al.

(10) Patent No.: US 8,740,228 B2
(45) Date of Patent: Jun. 3, 2014

(54) DOLLY WITH WHEEL ACCEPTANCE AREA

(75) Inventors: Samuel Joseph Patterson, Venice, CA (US); Kyle L. Baltz, Rossmoor, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 18 days.

(21) Appl. No.: 13/217,189

(22) Filed: Aug. 24, 2011

(65) Prior Publication Data

US 2012/0049472 A1    Mar. 1, 2012

Related U.S. Application Data

(60) Provisional application No. 61/376,670, filed on Aug. 24, 2010.

(51) Int. Cl.
*B62B 3/16*    (2006.01)

(52) U.S. Cl.
USPC .................. 280/33.998; 280/33.991; 206/503

(58) Field of Classification Search
USPC .......... 280/33.998, 79.3, 79.11, 79.4, 33.991, 280/33.992; 206/499; 211/13.1, 20, 23, 24
See application file for complete search history.

(56) References Cited

U.S. PATENT DOCUMENTS

| 5,445,396 | A | * | 8/1995 | Sebor | 280/33.998 |
| D437,669 | S | * | 2/2001 | Blason et al. | D34/23 |
| D456,972 | S | * | 5/2002 | Blason et al. | D34/23 |
| 6,866,463 | B2 | * | 3/2005 | Riordan et al. | 414/498 |
| 7,059,617 | B1 | * | 6/2006 | Verna | 280/79.3 |
| 2008/0296183 | A1 | * | 12/2008 | Meers | 206/232 |
| 2009/0085315 | A1 | * | 4/2009 | Meers et al. | 280/33.992 |

* cited by examiner

*Primary Examiner* — J. Allen Shriver, II
*Assistant Examiner* — Steve Clemmons
(74) *Attorney, Agent, or Firm* — Carlson, Gaskey & Olds

(57) ABSTRACT

A dolly includes a deck having a support surface and a plurality of casters below the deck. The deck includes a plurality of caster-receiving pockets formed in an upper surface of the deck. The caster-receiving pockets are aligned with the casters, such that the casters of an identical dolly could be received in the caster-receiving pockets. The caster-receiving pockets are oriented at an acute angle relative to the end edges and side edges of the dolly. When stacked, the dollies are more consistently aligned and the stack is vertical.

12 Claims, 12 Drawing Sheets

US 8,740,228 B2

DOLLY WITH WHEEL ACCEPTANCE AREA

This application claims priority to U.S. Provisional Application Ser. No. 61/376,670, filed Aug. 24, 2010.

BACKGROUND

A dolly for bakery trays or other items typically includes a deck supported by casters. A stack of trays or other items can be supported on the dolly for moving the stack. The casters can swivel about an axis perpendicular to the deck. The swivel axis is often offset relative to the wheel axis, so that the caster will pivot automatically based upon the direction that the user pushes the dolly. However, when the dollies are stacked upon one another, there is room for the casters to roll within the caster-receiving pockets, so that if the dollies in a stack all roll in the same direction, there can be significant lean in the stack.

SUMMARY

A dolly according to example embodiments of the present invention includes a deck having a support surface and a plurality of casters below the deck. The deck includes a plurality of caster-receiving pockets formed in an upper surface of the deck. The caster-receiving pockets are aligned with the casters, such that the casters of an identical dolly could be received in the caster-receiving pockets. The caster-receiving pockets are oriented at an acute angle relative to the end edges and side edges of the dolly. When stacked, the dollies are more consistently aligned, they do not roll relative to one another and the stack is vertical.

Optionally, the caster-receiving pockets may be tapered, such that the width of the pockets is narrower at the bottom of the pockets and wider at the upper end of the pockets. This assists in rotating the casters to the proper orientation and accommodates wheels of different sizes.

In a method according to the present invention, one dolly is placed upon another. A first side edge of the upper dolly is lifted, and the casters on the opposite, second side are rolled toward the opposite side of the lower dolly, which causes those casters to cast toward the first side. This brings those casters into partial alignment with their respective caster-receiving pockets. As the casters hit the angled side walls of the caster-receiving pockets and as the first side of the upper dolly is lowered (and maybe pulled back slightly), the casters along the second side edge fall into and rotate to align with the caster-receiving pockets on the lower dolly. The casters on the lifted side edge of the upper dolly also rotate slightly due to gravity to an orientation close enough to alignment with the caster-receiving pockets that when the dolly is lowered, the casters rotate into alignment with the pockets (alternatively, small alignment by hand of these casters may be necessary).

DETAILED DESCRIPTION OF PREFERRED EMBODIMENTS

Figure 1:
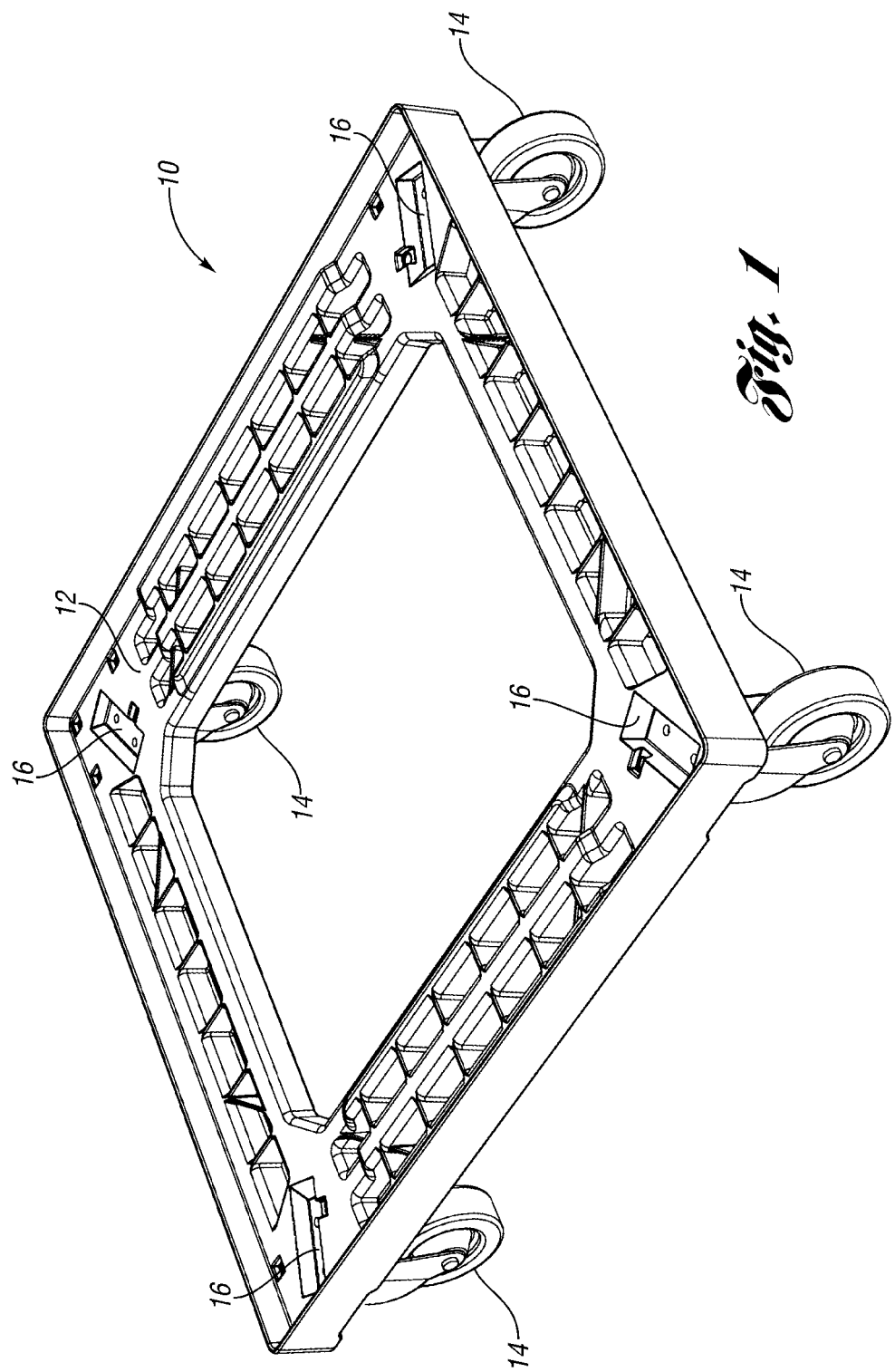
FIG. 1 is a perspective view of a dolly according to a first embodiment of the present invention.

A dolly 10, such as for supporting bakery trays, according to one embodiment is shown in FIGS. 1-14. Referring to FIG. 1, the dolly 10 includes a deck 12 having casters 14 extending down from an underside thereof. The deck 12 includes a plurality of caster-receiving pockets 16 formed in an upper surface of the deck 12. The caster-receiving pockets 16 are aligned with the casters 14, such that the casters 14 of an identical dolly could be received in the caster-receiving pockets 16. In the example shown, the dolly 10 has four casters 14, but more could be used.

Figure 2:
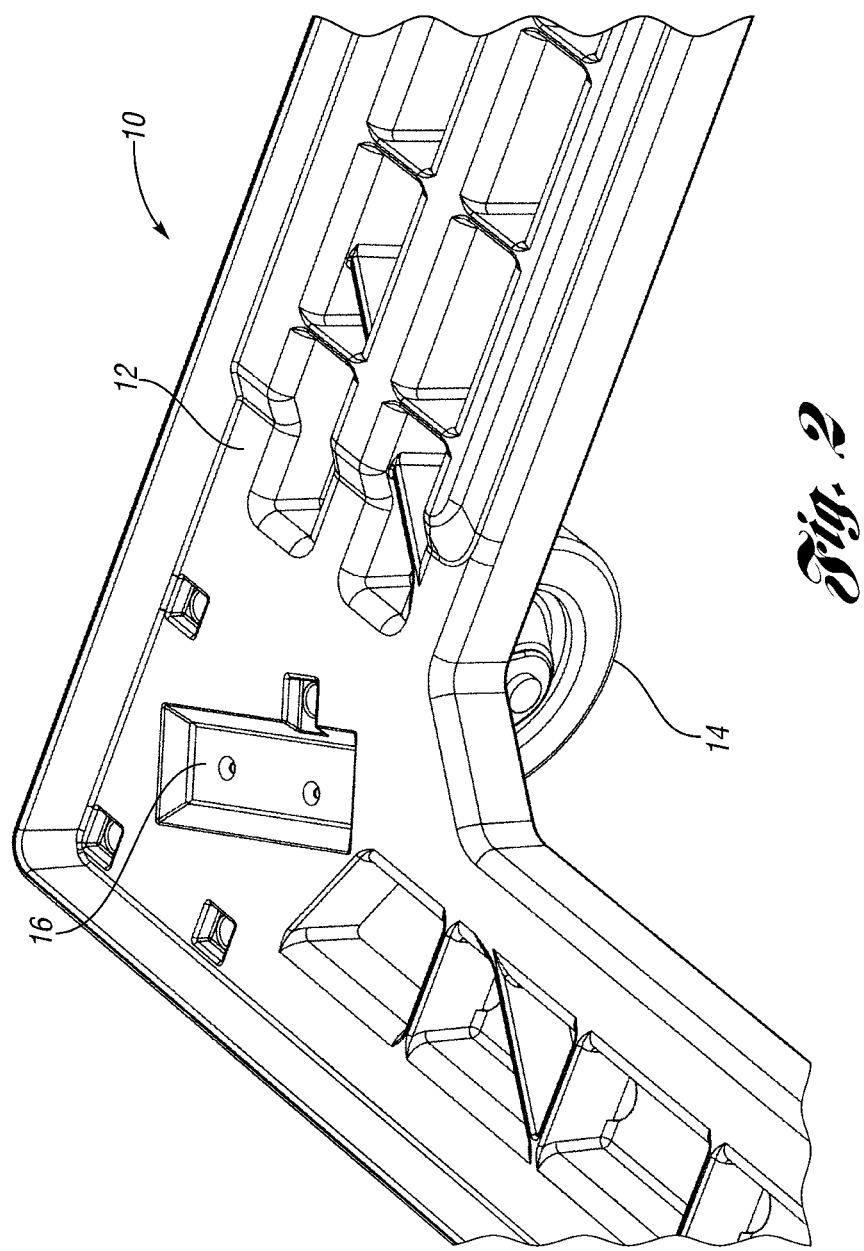
FIG. 2 is an enlarged view of one corner of the dolly of FIG. 1.

As shown in FIG. 2, the caster-receiving pockets 16 are oriented at an acute angle relative to the end edges and side edges of the dolly 10. The pockets 16 are not parallel to either the end edges or the side edges of the dolly 10. The pockets 16 are not parallel to either axis of the dolly 10, defined as an axis through the casters along one side edge (long edge) and an axis through the casters along one end edge (short edge) of the dolly 10. For example, the caster-receiving pocket 16 shown in FIG. 2 is approximately 24 degrees relative to the end edge (short edge) of the deck 12 and approximately 76 degrees relative to the side edge (long edge) of the deck 12. Other acute non-parallel angles could be used, but as a preferred option the caster-receiving pockets 16 are less than 45 degrees relative to the end edge (short edge) of the deck 12.

Figure 3:
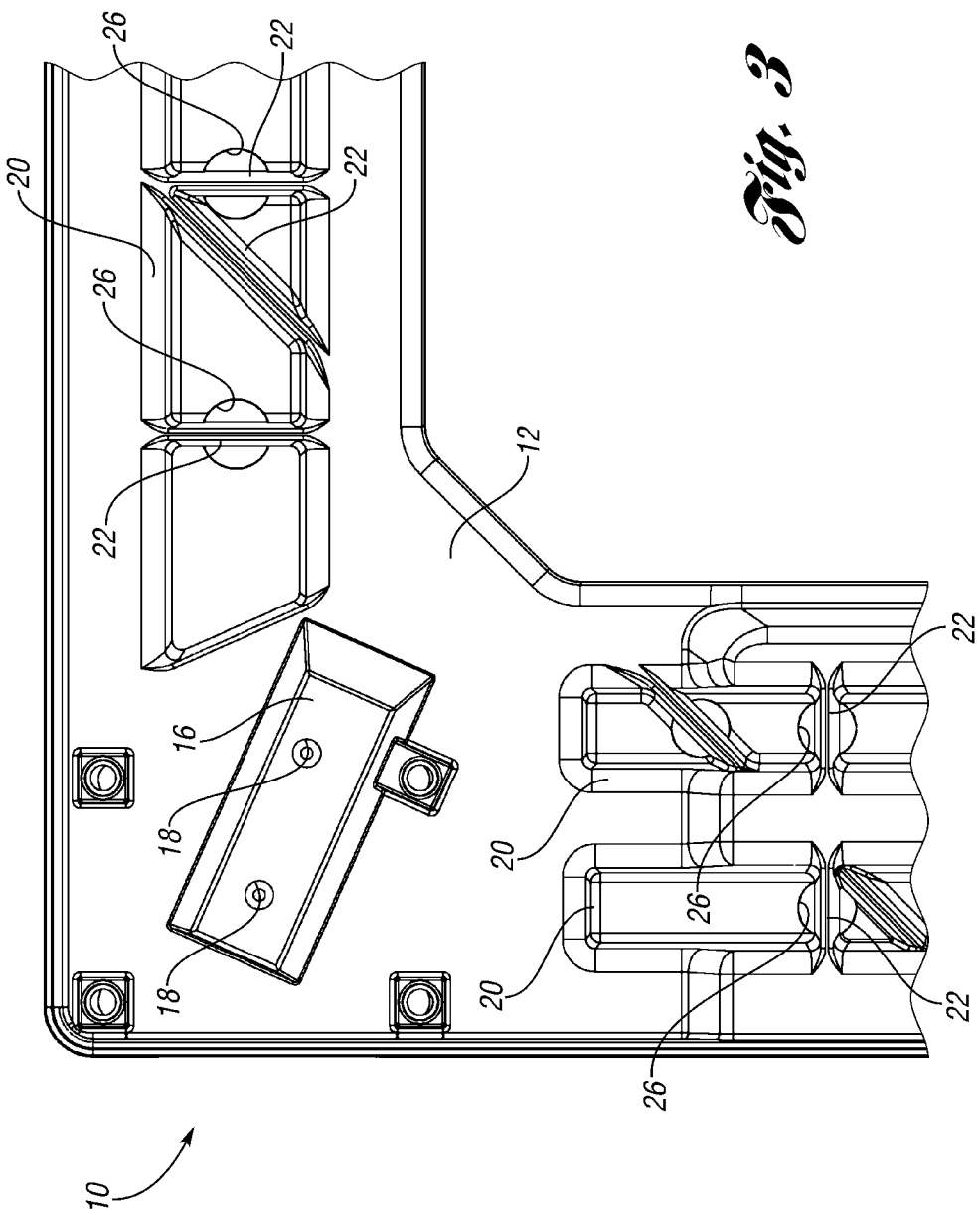
FIG. 3 is a top view of the corner of the dolly of FIG. 2.

Referring to FIG. 3, the caster-receiving pockets 16 each include drainage openings 18 therethrough to prevent liquid accumulation in the caster-receiving pockets 16. The deck 12 includes a plurality of reinforcing channels 20 having transverse ribs 22 extending across. Drainage openings 26 are formed through the deck 12 below the ribs 22.

Figure 4:
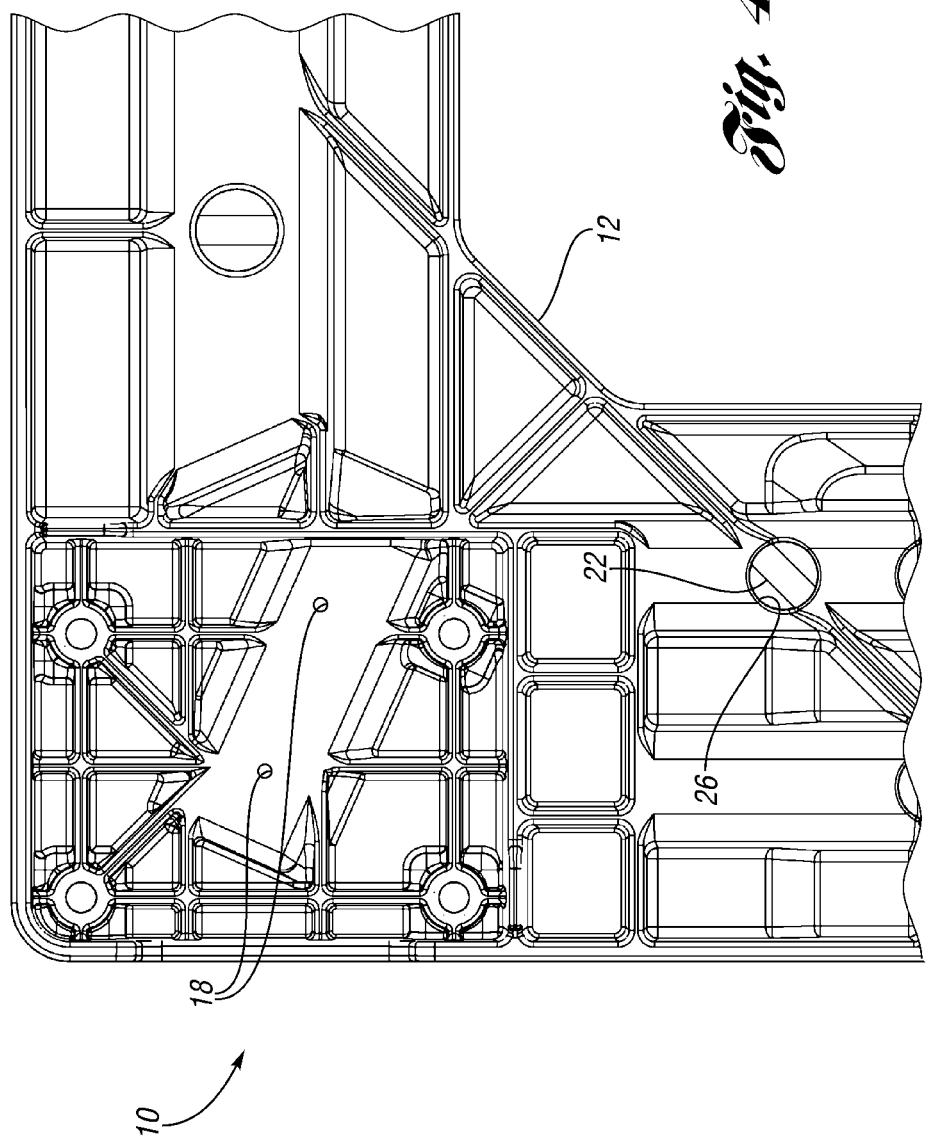
FIG. 4 is a bottom view of the corner of the dolly of FIG. 2.

FIG. 4 is a bottom view of the corner of the deck 12 of FIG. 3. As shown, the drainage openings 26 are formed through the deck 12 and aligned with the ribs 22.

Figure 5:
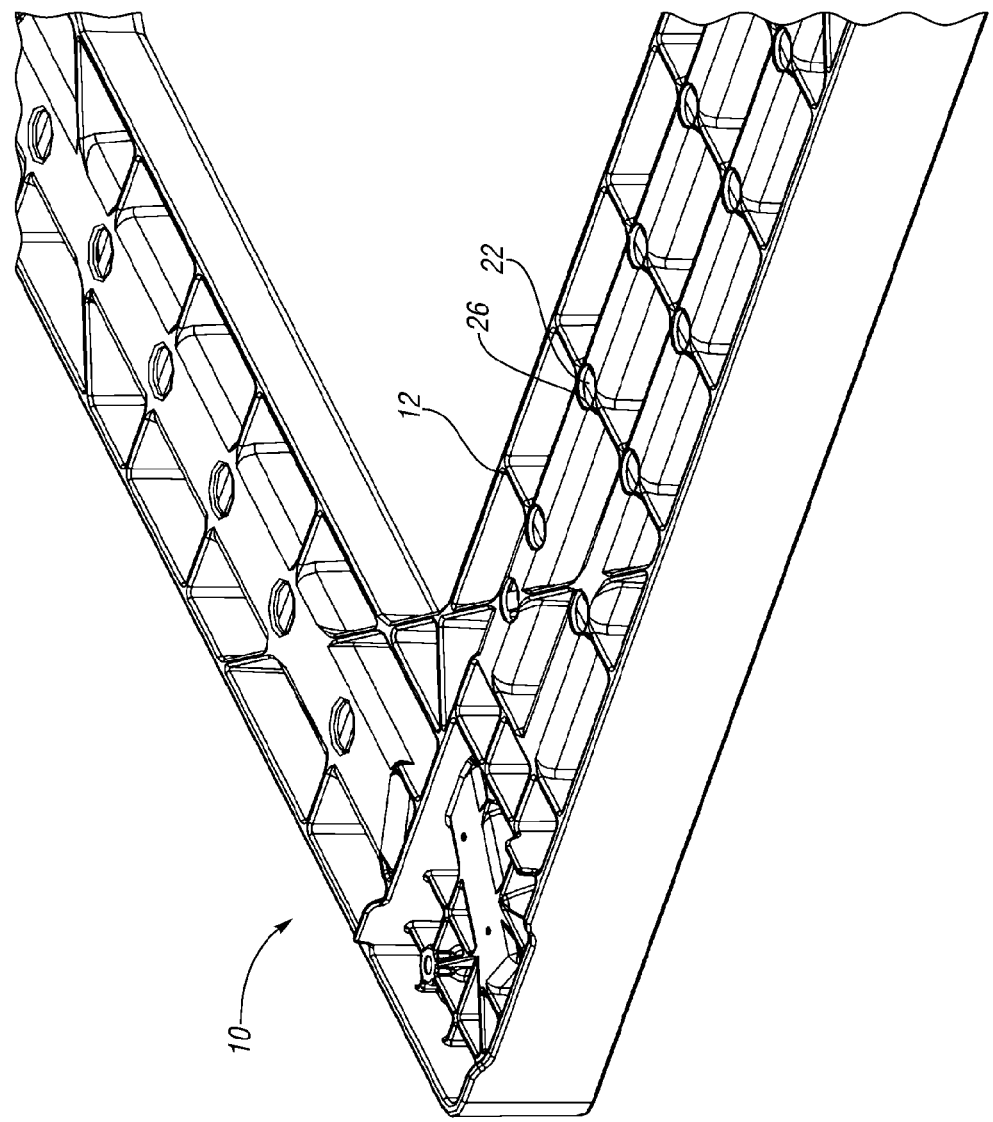
FIG. 5 is a bottom perspective view of the corner of FIG. 2.
Figure 6:
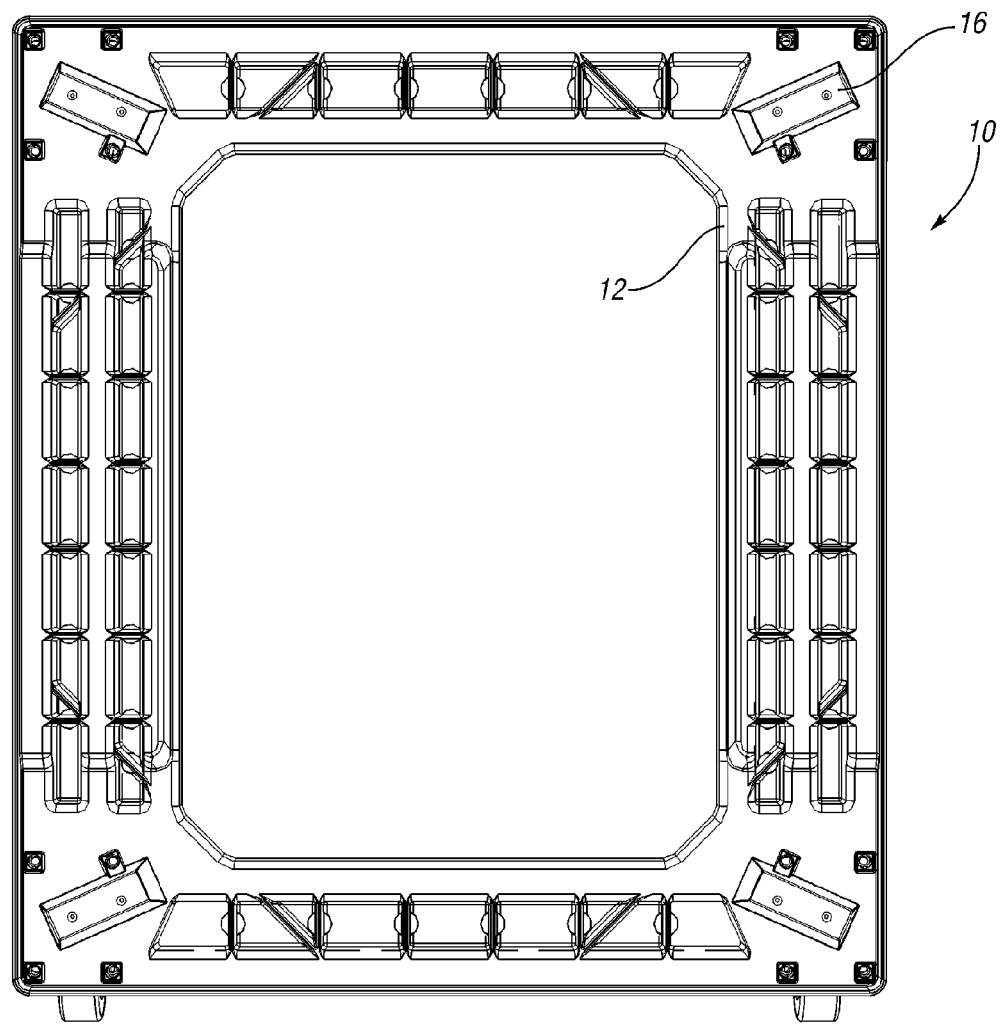
FIG. 6 is a top view of the dolly of FIG. 1.

FIG. 5 is a bottom perspective view of the corner of FIG. 4. FIG. 6 is a top view of the dolly 10. As shown, adjacent caster-receiving pockets 16 are not parallel to one another, although caster-receiving pockets 16 in opposite corners are (but need not be) parallel to one another.

Figure 7:
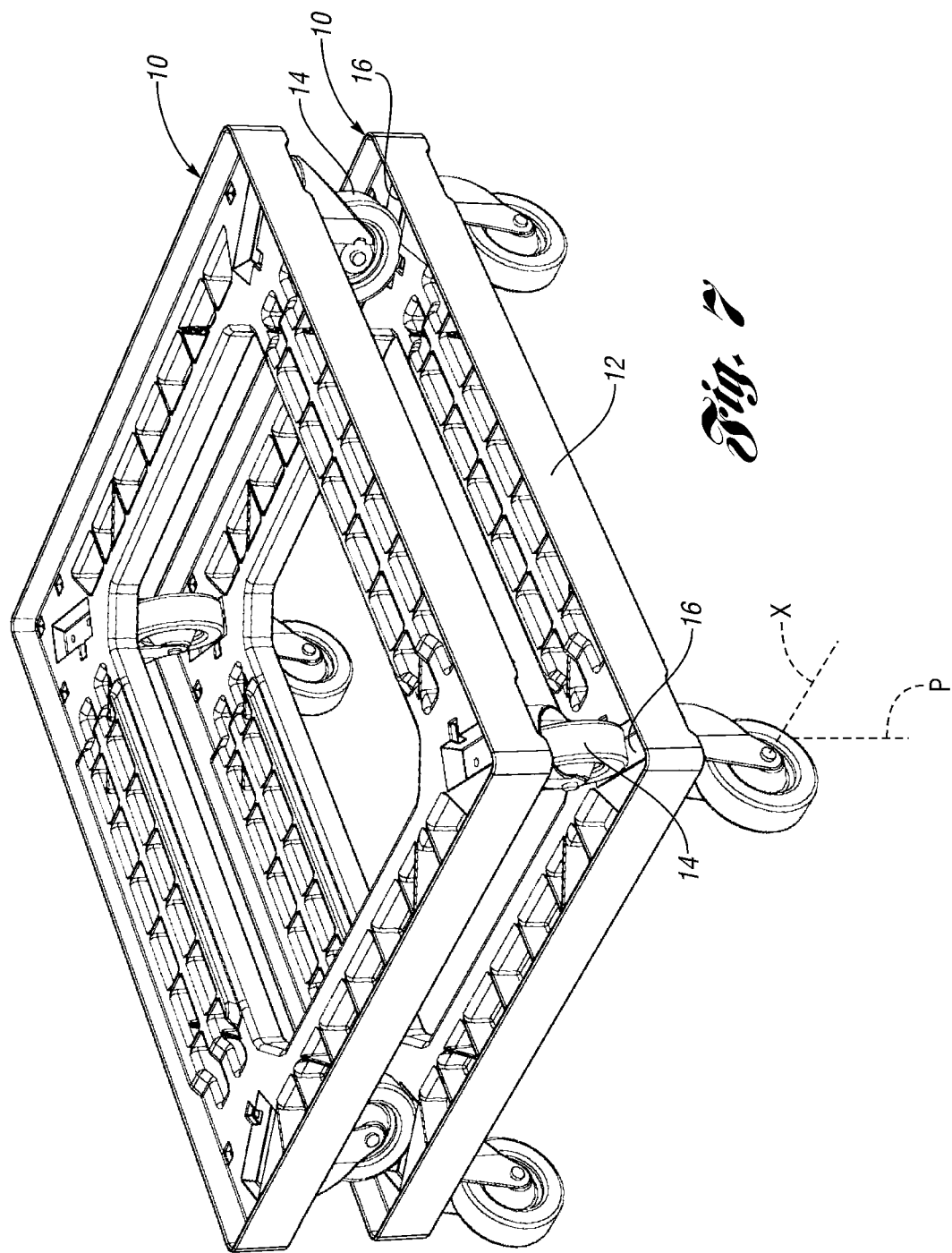
FIG. 7 is a perspective view of the dolly of FIG. 1 with a similar dolly stacked thereon.
Figure 8:
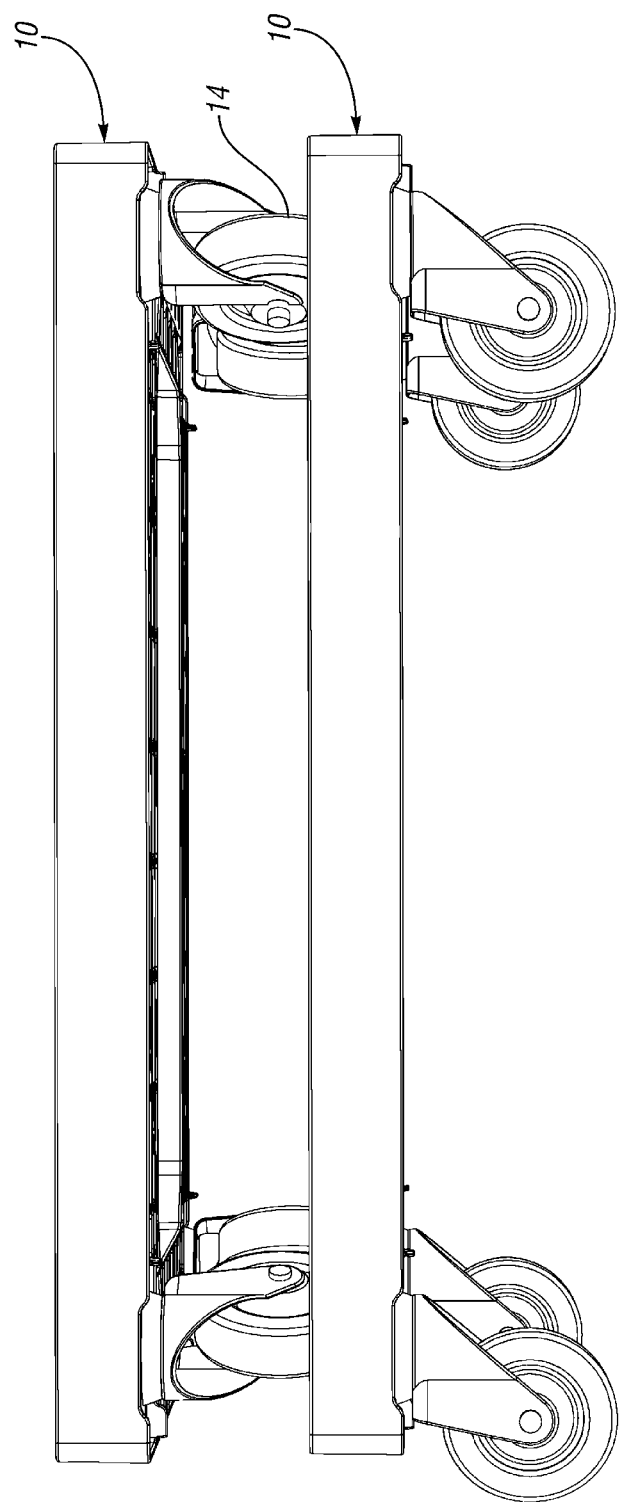
FIG. 8 is a side view of the dollies of FIG. 7.

FIG. 7 shows the dolly 10 with an identical dolly 10 stacked thereon. As shown, the casters 14 (more particularly, the wheels of the casters 14) of the upper dolly 10 are received in the caster-receiving pockets 16 of the lower dolly 10. As indicated, the wheels of the casters 14 rotate about an axis x, which is offset horizontally from the axis P about which the caster swivels relative to the deck 12. This offset is common for casters, so that the casters 14 automatically rotate based upon the direction that the dolly 10 is pushed. FIG. 8 is a side view of the dollies 10 of FIG. 7.

Figure 9:
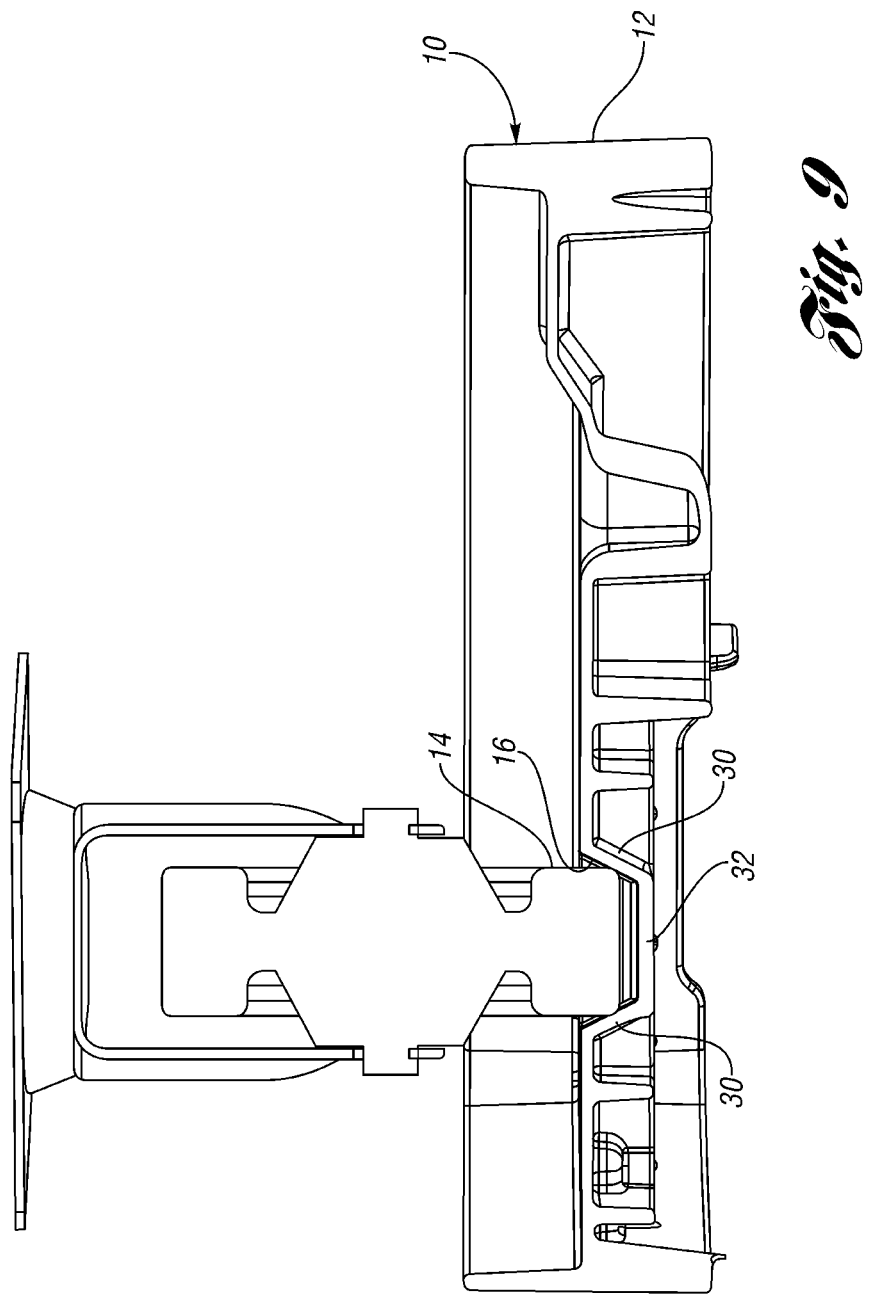
FIG. 9 is a section view through one of the wheels of the upper dolly of FIG. 7 and a portion of the deck of the dolly of FIG. 7.
Figure 10:
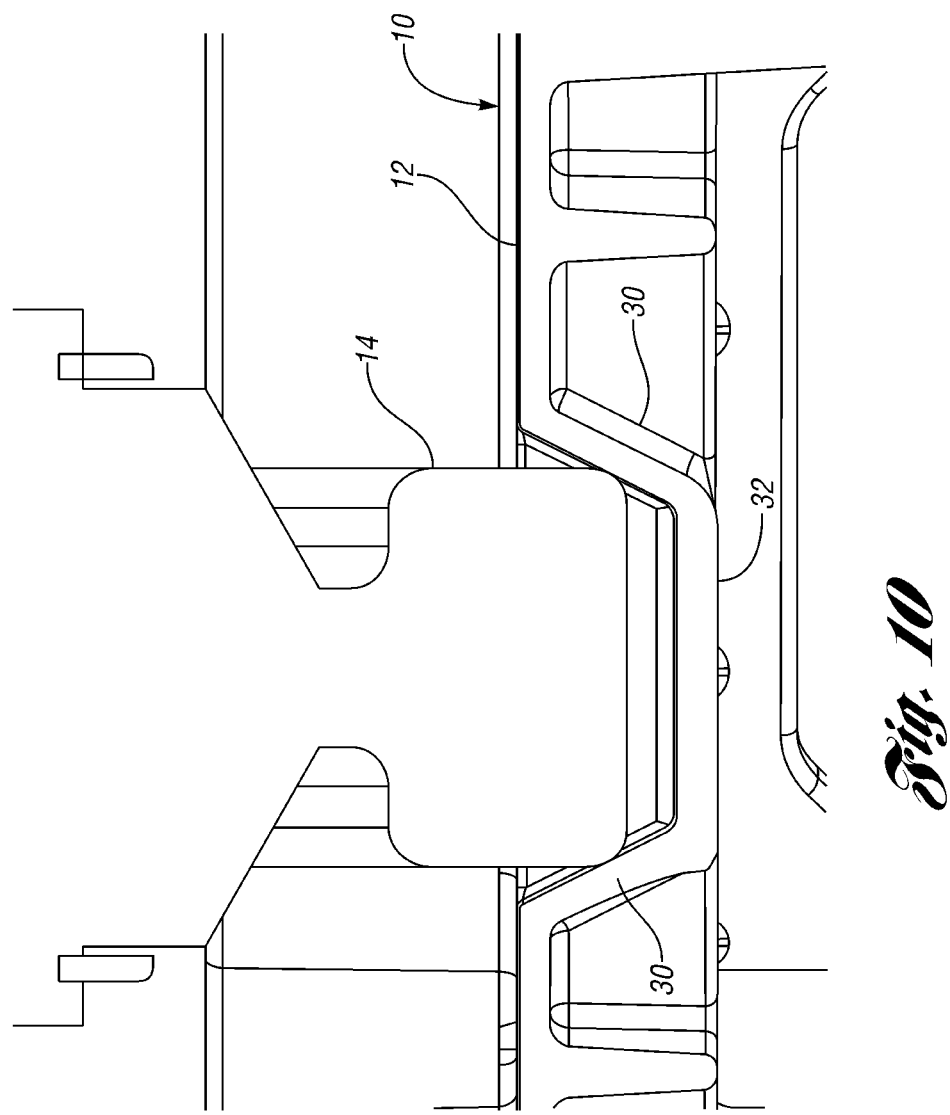
FIG. 10 is an enlarged view of a portion of FIG. 9.

FIG. 9 is a section view through one of the casters 14 of the upper dolly 10 and a corner portion of the lower dolly 10 of FIG. 8. FIG. 10 is an enlarged view of a portion of FIG. 9. As shown, the caster-receiving pockets 16 each include a bottom wall 32 having side walls 30 angled toward one another such that the caster-receiving pockets 16 are tapered width-wise toward the bottom of the caster-receiving pockets 16. The wheel of the caster 14 is received in the caster-receiving pocket 16 such that wheels of various sizes will fit snugly within the caster-receiving pockets 16. The taper also assists in rotating the caster 14 to the proper orientation in the caster-receiving pocket 16.

Figure 11:
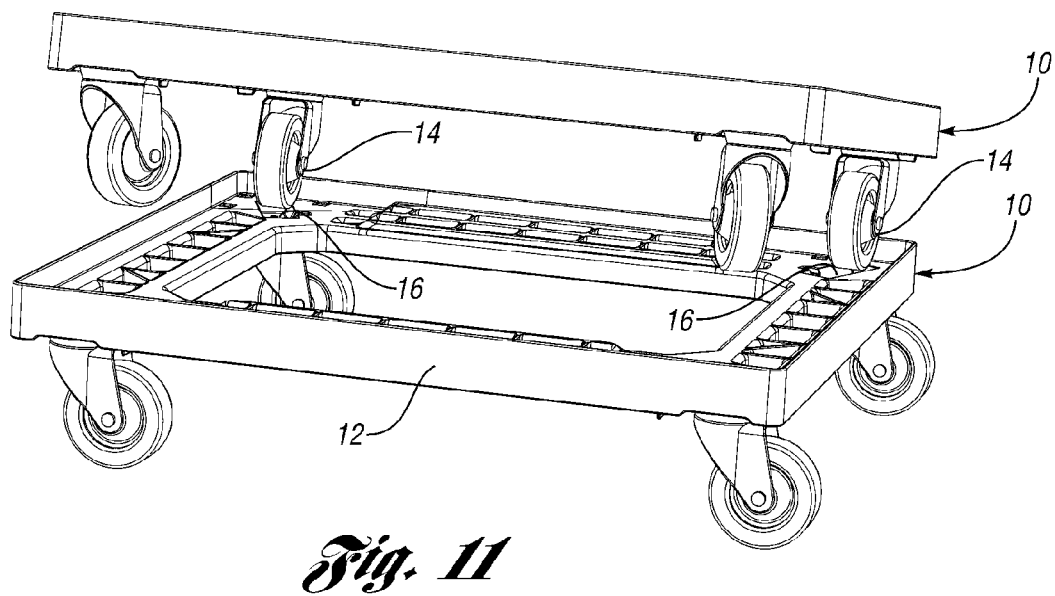
FIG. 11 shows a first step in stacking the dollies of FIG. 7.
Figure 12:
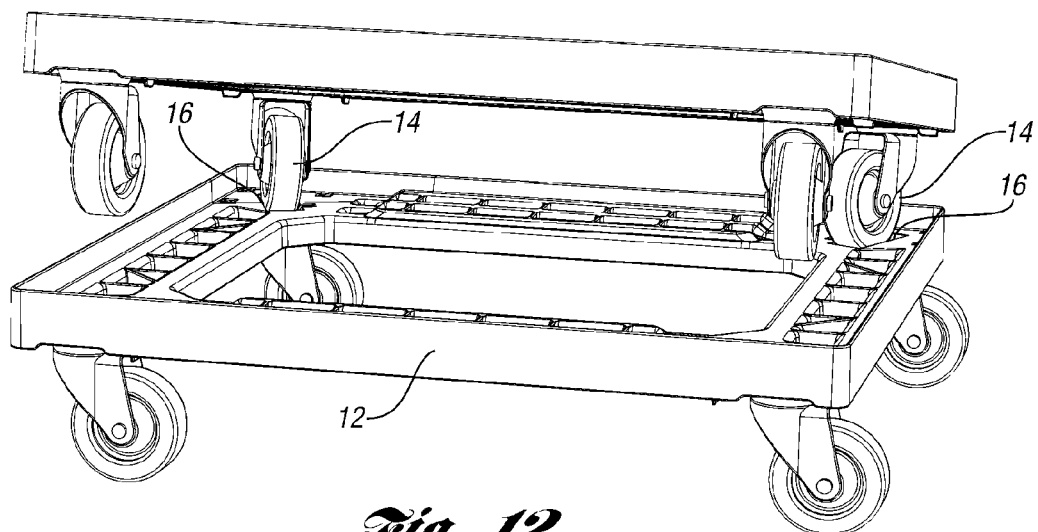
FIG. 12 shows a second step in stacking the dollies of FIG. 11.
Figure 13:
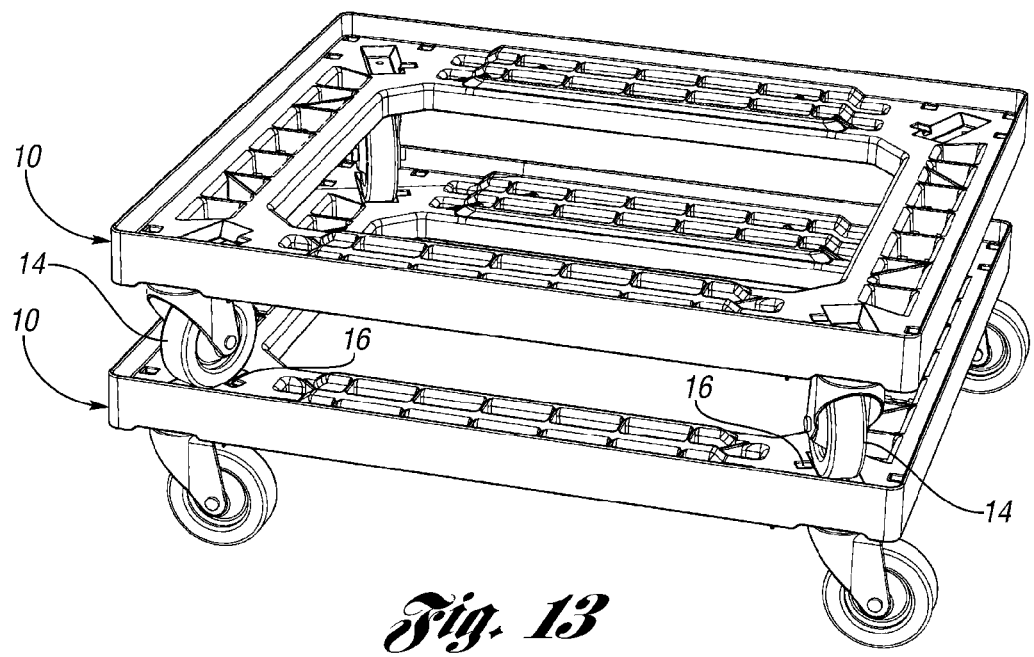
FIG. 13 is a perspective view of the dollies of FIG. 12 stacked.
Figure 14:
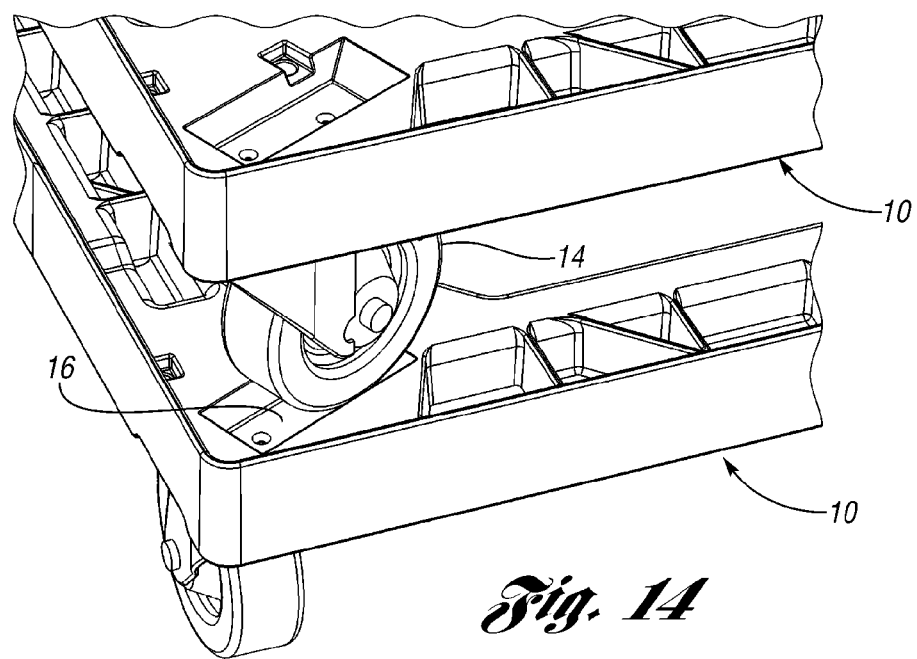
FIG. 14 is an enlarged view of a corner of the dollies of FIG. 13.

FIGS. 11-13 show the sequence of stacking the upper dolly 10 on the lower dolly 10. First the upper dolly 10 is angled such that the wheels of the casters 14 on one side of the upper dolly 10 are rolled on the deck 12 of the lower dolly 10 toward the caster-receiving pockets 16, which causes those casters 14 to cast toward the first side. This brings those casters 14 into partial alignment with their respective caster-receiving pockets 16. As the casters 14 hit the angled side walls of the caster-receiving pockets 16 and as the first side of the upper dolly 10 is lowered (and maybe pulled back slightly), the casters 14 along the second side edge fall into and rotate to align with the caster-receiving pockets on the lower dolly 10, as shown in FIG. 12. The casters 14 on the lifted side edge of the upper dolly 10 also rotate slightly due to gravity to an orientation close enough to alignment with the caster-receiving pockets 16 that when the dolly 10 is lowered, the casters 14 rotate into alignment with the pockets 16 (alternatively, small alignment by hand of these casters 14 may be necessary), as shown in FIGS. 13 and 14.

With the wheels of adjacent casters 14 cast inward toward one another and not parallel to one another, the upper dolly 10 is inhibited from rolling relative to the lower dolly 10. Further, the upper dolly 10 is more stably and consistently aligned with the lower dolly 10.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope

What is claimed is:

1. A dolly comprising:
    a deck having a support surface and a plurality of caster-receiving pockets, wherein the plurality of caster-receiving pockets are not parallel to one another, wherein the caster-receiving pockets have a pair of side walls angled toward one another to a bottom wall; and
    a plurality of casters below the deck aligned with the caster-receiving pockets, wherein each of the caster-receiving pockets accepts one of the casters of an identical dolly stacked thereon in only a single orientation, wherein each of the caster-receiving pockets accepts one of the casters of the identical dolly stacked thereon with a wheel of each caster having a circumferential surface meeting side surfaces at edges thereof and such that the edges contact the side walls of the caster-receiving pocket.

2. The dolly of claim 1 wherein the caster-receiving pockets are not parallel to side edges or end edges of the dolly.

3. The dolly of claim 1 wherein the caster-receiving pockets are not parallel to axes of the dolly.

4. The dolly of claim 1 wherein the caster-receiving pockets are oriented less than 45 degrees relative to short edges of the dolly, but not parallel to the short edges of the dolly.

5. The dolly of claim 1 wherein the caster-receiving pockets have a tapered width.

6. The dolly of claim 1 wherein the casters each include a swivel axis offset horizontally from a wheel axis.

7. The dolly of claim 1 wherein the plurality of casters includes four casters.

8. The dolly of claim 1 wherein bottom edges at which the side walls intersect the bottom wall within each caster-receiving pocket are generally parallel to one another.

9. The dolly of claim 8 wherein the bottom edges of the side walls of the caster-receiving pockets are oriented less than 45 degrees relative to short edges of the dolly, but not parallel to the short edges of the dolly.

10. The dolly of claim 1 wherein the side walls of the caster-receiving pockets are oriented less than 45 degrees relative to short edges of the dolly, but not parallel to the short edges of the dolly.

11. A dolly comprising:
    a deck having a support surface and a plurality of caster-receiving pockets, the caster-receiving pockets each including a bottom wall having side walls angled toward one another such that the caster-receiving pockets are tapered width-wise toward the bottom of the caster-receiving pockets; and
    a plurality of casters below the deck aligned with the caster-receiving pockets, wherein each of the caster-receiving pockets accepts one of the casters of an identical dolly stacked thereon with a wheel of each caster having a circumferential surface meeting side surfaces at edges thereof and such that the edges contact the side walls of the caster-receiving pocket.

12. The dolly of claim 11 wherein the plurality of casters includes four casters.

* * * * *